(12) United States Patent
Mao et al.

(10) Patent No.: US 12,405,669 B2
(45) Date of Patent: Sep. 2, 2025

(54) VIBRATION FEEDBACK DEVICE, HANDHELD COMMUNICATION DEVICE, AND WEARABLE DEVICE

(71) Applicant: AAC Technologies (Nanjing) Co., Ltd., Jiangsu (CN)

(72) Inventors: Lubin Mao, Nanjing (CN); Yun Tang, Nanjing (CN); Jie Ma, Nanjing (CN)

(73) Assignee: AAC Technologies (Nanjing) Co., Ltd., Nanjing (CN)

( * ) Notice: Subject to any disclaimer, the term of this patent is extended or adjusted under 35 U.S.C. 154(b) by 44 days.

(21) Appl. No.: 18/393,574

(22) Filed: Dec. 21, 2023

(65) Prior Publication Data

US 2024/0402808 A1    Dec. 5, 2024

Related U.S. Application Data

(63) Continuation of application No. PCT/CN2023/096708, filed on May 29, 2023.

(51) Int. Cl.
*G06F 3/01* (2006.01)
*H01H 13/14* (2006.01)

(52) U.S. Cl.
CPC .............. *G06F 3/016* (2013.01); *H01H 13/14* (2013.01)

(58) Field of Classification Search
None
See application file for complete search history.

(56) References Cited

U.S. PATENT DOCUMENTS

| | | | |
|---|---|---|---|
| 2012/0108299 A1* | 5/2012 | Yang | H02K 33/16 |
| | | | 455/567 |
| 2020/0103970 A1* | 4/2020 | Harrison | G06F 3/016 |
| 2021/0405753 A1* | 12/2021 | Amin-Shahidi | G06F 3/016 |
| 2023/0305637 A1* | 9/2023 | Rosenberg | H01H 13/85 |

* cited by examiner

*Primary Examiner* — Joseph R Haley
(74) *Attorney, Agent, or Firm* — Wiersch Law Group

(57) ABSTRACT

A vibration feedback device, a handheld communication device including the same and a wearable device. The vibration feedback device is provided on a frame and includes a button fixed to the frame; a sensor for detecting a pressing state of the button; and a vibration motor fixed to the frame and arranged below the button. The frame includes an outer side surface, an inner side surface, and a mounting hole penetrating through the outer and inner side surfaces; the vibration motor includes a stator fixed to the inner side surface, an antenna arranged in the mounting hole, and an elastic connection member connecting the antenna to the stator; and a direction of a pressing force of the button is perpendicular to a vibrating direction of the antenna. The vibration feedback device provides a vibration feedback that is different from the direction of the pressing force and is diversified.

7 Claims, 3 Drawing Sheets

VIBRATION FEEDBACK DEVICE, HANDHELD COMMUNICATION DEVICE, AND WEARABLE DEVICE

CROSS-REFERENCE TO RELATED APPLICATIONS

This application is a continuation of International Application No. PCT/CN2023/096708, filed on May 29, 2023, which hereby is incorporated by reference in its entirety.

TECHNICAL FIELD

The present disclosure relates to the technical field of vibration feedback, and in particular, to a vibration feedback device, a handheld communication device including the vibration feedback device, and a wearable device.

BACKGROUND

The vibration feedback technology can reproduce a touch feeling for the user through a series of actions such as acting force and vibration. This mechanical stimulus may be applied to assisted creation and control of virtual scenes or virtual objects in computer simulations, as well as to enhance remote manipulation of machines and apparatus.

However, the existing vibration feedback product generally has an insufficient tactile feedback precision and a single vibration feeling, which affect the user experience.

In view of this, the present disclosure provides a new vibration feedback device to solve the above-mentioned technical problems.

SUMMARY

An object of the present disclosure is to provide a vibration feedback device, a vibrating direction of which is different from a direction of a pressing force and is diversified.

In an aspect, the present provides a vibration feedback device, the vibration feedback device is provided on a frame, and includes: a button fixed to the frame; a sensor for detecting a pressing state of the button; and a vibration motor fixed to the frame and arranged below the button. The frame has a mounting hole penetrating through the frame; the frame includes an outer side surface and an inner side surface opposite to the outer side surface, and the mounting hole penetrates through both the outer side surface and the inner side surface; the vibration motor includes a stator fixed to the inner side surface of the frame, an antenna arranged in the mounting hole, and an elastic connection member that connects the antenna to the stator; and a direction of a pressing force of the button is perpendicular to a vibrating direction of the antenna.

As an improvement, the stator includes a baseplate fixed to the frame and a solenoid assembly fixed to the baseplate, and the elastic connection member includes an end connected to the antenna and another end connected to the baseplate.

As an improvement, the baseplate includes a bearing portion for bearing the solenoid assembly, a first extension portion extending from the bearing portion to two sides and connected to the frame, and a second extension portion extending from the bearing portion to the mounting hole and connected to the elastic connection member.

As an improvement, the antenna includes a housing and a magnet fixed in the housing, the housing is fixed to the button, and the magnet is arranged at two sides of the solenoid assembly.

As an improvement, the housing includes a top wall and a side wall bent and extending from the top wall, and the top wall and the side wall jointly define a receiving space; and the top wall is fixed relative to the button, and the magnet is fixed to the side wall.

As an improvement, the housing is made of a magnetic conductive material.

As an improvement, the sensor is of a sheet structure and is clamped between the top wall and the button.

As an improvement, the magnet includes a pair of magnets, the pair of magnets is magnetized along the vibrating direction of the antenna, and the pair of magnets is arranged with same poles facing each other.

In another aspect, the present disclosure provides a handheld communication device, including a frame, a screen fixed to a side of the frame, and a backplate fixed to another side of the frame. The handheld communication device further includes a vibration feedback device fixed to the frame, and the vibration feedback device includes: a button fixed to the frame; a sensor for detecting a pressing state of the button; and a vibration motor fixed to the frame and arranged below the button. The frame has a mounting hole penetrating through the frame; the frame includes an outer side surface and an inner side surface opposite to the outer side surface, and the mounting hole penetrates through both the outer side surface and the inner side surface; the vibration motor includes a stator fixed to the inner side surface of the frame, an antenna arranged in the mounting hole, and an elastic connection member that connects the antenna to the stator; and a direction of a pressing force of the button is perpendicular to a vibrating direction of the antenna.

In an another aspect, the present disclosure provides a wearable device, including a rim, a lens provided on the rim, and a frame extending backwards from two sides of the rim. The wearable device further includes a vibration feedback device fixed to the frame, and the vibration feedback device includes: a button fixed to the frame; a sensor for detecting a pressing state of the button; and a vibration motor fixed to the frame and arranged below the button. The frame has a mounting hole penetrating through the frame; the frame includes an outer side surface and an inner side surface opposite to the outer side surface, and the mounting hole penetrates through both the outer side surface and the inner side surface; the vibration motor includes a stator fixed to the inner side surface of the frame, an antenna arranged in the mounting hole, and an elastic connection member that connects the antenna to the stator; and a direction of a pressing force of the button is perpendicular to a vibrating direction of the antenna.

DESCRIPTION OF EMBODIMENTS

The technical solutions in embodiments of the present disclosure will be described below in connection with the drawings in the embodiments of the present disclosure, and it is apparent that the embodiments described herein are merely a part, not all of the embodiments of the present disclosure. Based on the embodiments of the present disclosure, all other embodiments obtained by those of ordinary skill in the art without creative efforts shall fall within a scope of the present disclosure.

Figure 1:
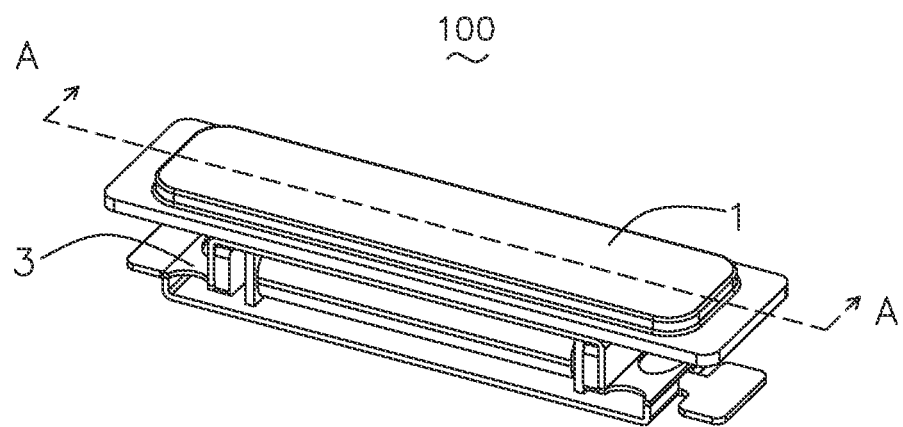
FIG. 1 is a perspective view of a vibration feedback device according to an embodiment of the present disclosure.
Figure 2:
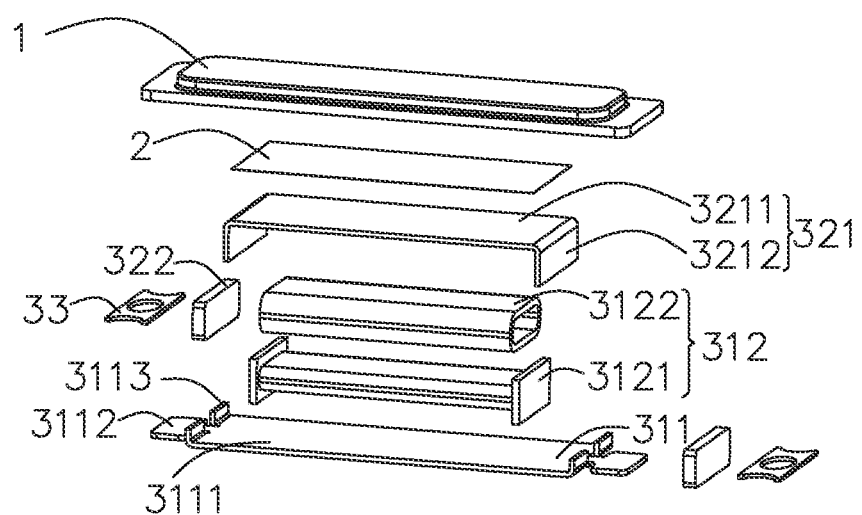
FIG. 2 is an exploded view of the vibration feedback device shown in FIG. 1.
Figure 3:
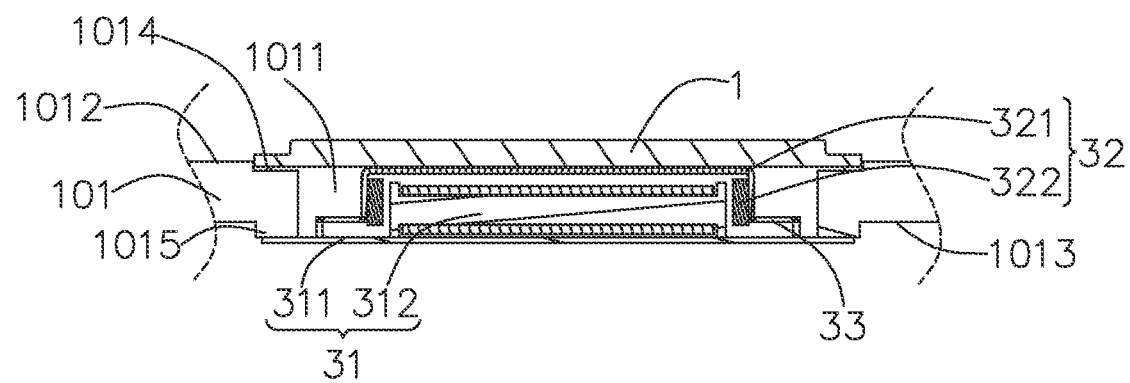
FIG. 3 is a cross-sectional view taken along A-A when the vibration feedback device shown in FIG. 1 is provided on the frame.

Referring to FIG. 1 to FIG. 3, an embodiment of the present disclosure provides a vibration feedback device 100 provided on a frame 101, and the vibration feedback device 100 includes a button 1 fixed to the frame 101, a sensor 2 for detecting a pressing state of the button, and a vibration motor 3 fixed to the frame 101 and arranged below the button 1.

The frame 101 has a mounting hole 1011 penetrating through the frame 101. The frame 101 includes an outer side surface 1012 and an inner side surface 1013 opposite to the outer side surface 1012, and the mounting hole 1011 penetrates through both the outer side surface 1012 and the inner side surface 1013. The button 1 protrudes from the outer side surface 1012 of the frame 101. The outer side surface 1012 has a recess 1014, and the inner side surface 1013 has a protrusion 1015. The button 1 is fitted and fixed in the recess 1014 of the outer side surface 1012, and the vibration motor 3 is fixedly connected to the protrusion 1015.

In this embodiment, the sensor 2 is of a sheet structure and is arranged between the button 1 and the vibration motor 3. In other embodiments of the present disclosure, the sensor 2 may have another shape/be of another structure and may be mounted at another position of the vibration feedback device 100. The sensor 2 is configured to detect position information and strength information of a pressing force received by the button 1.

The vibration motor 3 includes a stator 31 fixed to the inner side surface 1013 of the frame 101, an antenna 32 located in the mounting hole 1011, and an elastic connection member 33 that connects the antenna 32 to the stator 31. The antenna 32 vibrates in a left-right direction, and a direction of the pressing force of the button 1 is perpendicular to a vibrating direction of the antenna 32.

The stator 31 includes a baseplate 311 fixed to the frame 101 and a solenoid assembly 312 fixed to the baseplate 311, and the baseplate 311 is fixedly connected to the protrusion 1015 of the frame 101. The elastic connection member 33 includes an end connected to the antenna 32, and another end connected to the baseplate 311. For example, the baseplate 311 includes a bearing portion 3111 for bearing the solenoid assembly 312, a first extension portion 3112 extending from the bearing portion 3111 towards two sides and fixedly connected to the frame 101, and a second extension portion 3113 extending from the bearing portion 3111 towards the mounting hole 1011 and connected to the elastic connection member 33. The solenoid assembly 312 includes an iron core 3121 made of a magnetic conductive material, and a solenoid 3122 wound around the iron core 3121.

The antenna 32 includes a housing 321 fixed relative to the button 1, and a magnet 322 fixed in the housing 321, and the magnet 322 is arranged at two sides of the solenoid assembly 312. The housing 321 includes a top wall 3211 fixed relative to the button 1, and a side wall 3212 bent and extending from the top wall 3211. The top wall 3211 the side wall 3212 jointly define a receiving space, and the magnet 322 is fixed to the side wall 3212. The housing 321 is made of a magnetic conductive material. The sensor 2 is clamped between the top wall 3211 and the button 1. The magnet 322 includes a pair of magnets 322. Along the vibrating direction of the antenna, the pair of magnets 322 is magnetized, and the pair of magnets 322 is arranged with same poles facing each other.

The elastic connection member 33 is of a flat sheet structure, and the elastic connection member 33 is made of a metal material.

During normal operation, when a finger presses the button 1, a pressure is generated in a direction perpendicular to the surface of the button 1, then the elastic connection member 33 deforms, and the sensor 2 detects action information of the pressure through a deformation of the elastic connection member 33. The action information includes a position information and a strength information of the pressure. A corresponding electrical signal is provided to the solenoid 3122 of the vibration motor 3 through a processor and a signal algorithm, so that the antenna 32 of the vibration motor 3 vibrates in a direction perpendicular to the pressure of the button, thereby providing a tactile feedback to the user. The tactile effect may be a button effect, a sliding button effect, and the like.

Figure 4:
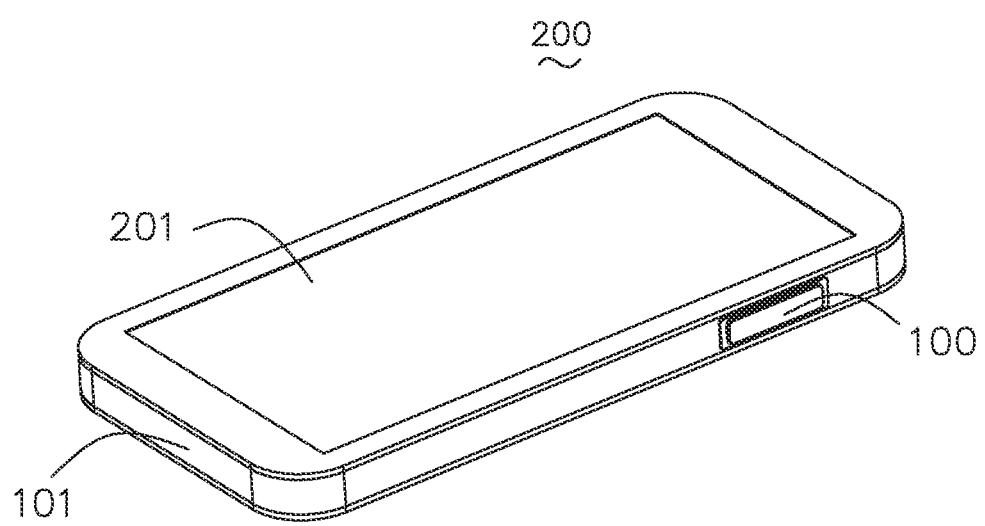
FIG. 4 is a perspective view of a handheld communication device according to an embodiment of the present disclosure.
Figure 5:
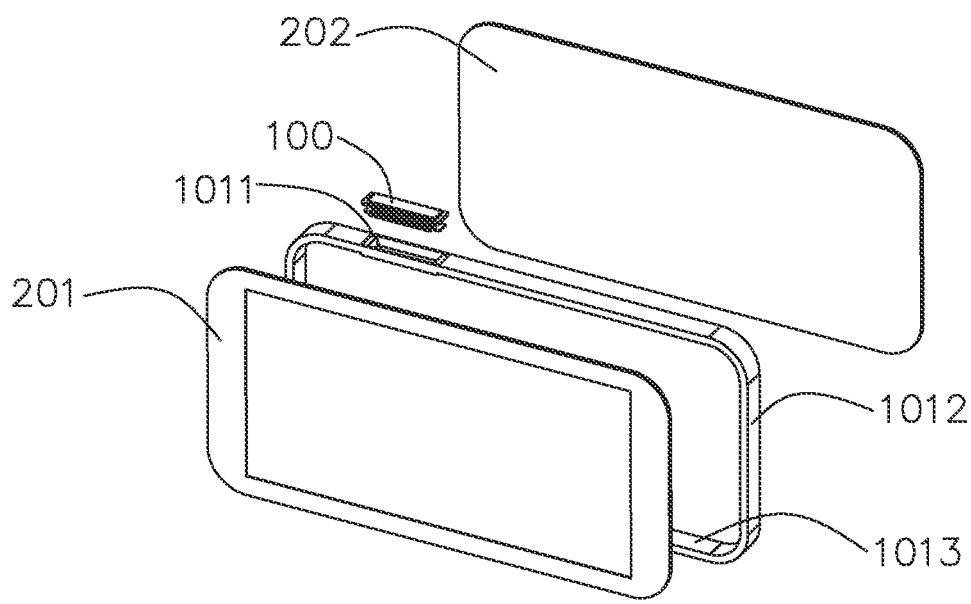
FIG. 5 is a partially exploded view of the handheld communication device shown in FIG. 4.

As shown in FIG. 4 to FIG. 5, an embodiment of the present disclosure further provides a handheld communication device 200, including a frame 101, a screen 201 fixed to a side of the frame 101, a backplate 202 fixed to another side of the frame 101, and the vibration feedback device 100 described above. The vibration feedback device 100 is provided in ae mounting hole 1011 of the frame 101 to provide a tactile feedback.

Figure 6:
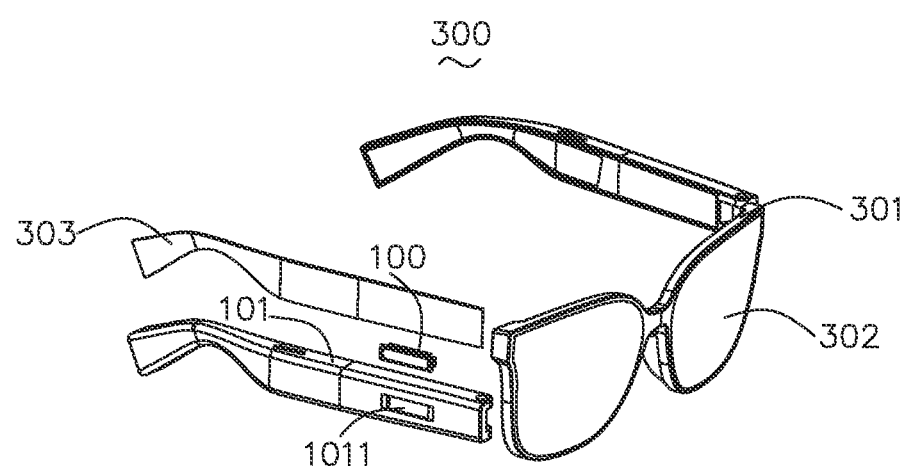
FIG. 6 is a partially exploded view of a wearable device according to an embodiment of the present disclosure.

As shown in FIG. 6, an embodiment of the present disclosure further provides a wearable device 300 including a rim 301, a lens 302 provided on the rim 301, a frame 101 extending backwards from two sides of the rim 301, and the vibration feedback device 100 described. The vibration feedback device 100 is provided in a mounting hole 1011 of the frame 101 to provide a tactile feedback. The frame 101 includes two components, that is, two legs of the wearable device 300. Each of the two legs is provided with the vibration feedback device 100. The wearable device 300 further includes a cover 303 that covers the mounting hole 1011 of the frame 101 to encapsulate the vibration feedback device 100.

Compared with the related art, the vibration feedback device provided by the present disclosure is provided on a frame and includes a button fixed to the frame, a sensor for detecting a pressing state of the button, and a vibration motor fixed to the frame and arranged below the button; the frame has a mounting hole penetrating through the frame and includes an outer side surface and an inner side surface opposite to the outer side surface, the mounting hole penetrates through both the outer side surface and the inner side surface; the vibration motor includes a stator fixed to the inner side surface of the frame, an antenna arranged in the mounting hole, and an elastic connection member that connects the antenna to the stator; and a direction of the pressing force of the button is perpendicular to a vibrating direction of the antenna. The present disclosure further provides a handheld communication device and a wearable device including the vibration feedback device. The vibrating direction of the vibration feedback device is perpendicular to the direction of the pressing force, thereby providing a different tactile vibration for users, and the vibration feeling is diversified. The handheld communication device and the wearable device including the vibration feedback device provided by the present disclosure further have a diverse tactile feedback.

The above description merely describes some of, rather than all of embodiments of the present disclosure, and it can be understood that those skilled in the art can further make improvements without departing from a concept of the present disclosure, but all of these improvements shall fall within a scope of the present disclosure.

What is claimed is:

1. A vibration feedback device, wherein the vibration feedback device is provided on a frame, and comprises:
   a button fixed to the frame;
   a sensor for detecting a pressing state of the button; and
   a vibration motor fixed to the frame and arranged below the button,
   wherein the frame has a mounting hole penetrating through the frame; the frame comprises an outer side surface and an inner side surface opposite to the outer side surface, and the mounting hole penetrates through both the outer side surface and the inner side surface; the vibration motor comprises a stator fixed to the inner side surface of the frame, an antenna arranged in the mounting hole, and an elastic connection member that connects the antenna to the stator; and a direction of a pressing force of the button is perpendicular to a vibrating direction of the antenna;
   the stator comprises a baseplate fixed to the frame and a solenoid assembly fixed to the baseplate, and the elastic connection member comprises an end connected to the antenna and another end connected to the baseplate;
   the antenna comprises a housing and a magnet fixed in the housing, the housing is fixed to the button, and the magnet is arranged at two sides of the solenoid assembly;
   the magnet comprises a pair of magnets, the pair of magnets is magnetized along the vibrating direction of the antenna, and the pair of magnets is arranged with same poles facing each other.

2. The vibration feedback device as described in claim 1, wherein the baseplate comprises a bearing portion for bearing the solenoid assembly, a first extension portion extending from the bearing portion to two sides and connected to the frame, and a second extension portion extending from the bearing portion to the mounting hole and connected to the elastic connection member.

3. The vibration feedback device as described in claim 1, wherein the housing comprises a top wall and a side wall bent and extending from the top wall, and the top wall and the side wall jointly define a receiving space; and the top wall is fixed relative to the button, and the magnet is fixed to the side wall.

4. The vibration feedback device as described in claim 1, wherein the housing is made of a magnetic conductive material.

5. The vibration feedback device as described in claim 3, wherein the sensor is of a sheet structure and is clamped between the top wall and the button.

6. A handheld communication device, comprising a frame, a screen fixed to a side of the frame, and a backplate fixed to another side of the frame, wherein the handheld communication device further comprises a vibration feedback device fixed to the frame, and the vibration feedback device comprises:
   a button fixed to the frame;
   a sensor for detecting a pressing state of the button; and
   a vibration motor fixed to the frame and arranged below the button,
   wherein the frame has a mounting hole penetrating through the frame; the frame comprises an outer side surface and an inner side surface opposite to the outer side surface, and the mounting hole penetrates through both the outer side surface and the inner side surface; the vibration motor comprises a stator fixed to the inner side surface of the frame, an antenna arranged in the mounting hole, and an elastic connection member that connects the antenna to the stator; and a direction of a pressing force of the button is perpendicular to a vibrating direction of the antenna;
   the stator comprises a baseplate fixed to the frame and a solenoid assembly fixed to the baseplate, and the elastic connection member comprises an end connected to the antenna and another end connected to the baseplate;
   the antenna comprises a housing and a magnet fixed in the housing, the housing is fixed to the button, and the magnet is arranged at two sides of the solenoid assembly;
   the magnet comprises a pair of magnets, the pair of magnets is magnetized along the vibrating direction of the antenna, and the pair of magnets is arranged with same poles facing each other.

7. A wearable device, comprising a rim, a lens provided on the rim, and a frame extending backwards from two sides of the rim, wherein the wearable device further comprises a vibration feedback device fixed to the frame, and the vibration feedback device comprises:
   a button fixed to the frame;
   a sensor for detecting a pressing state of the button; and
   a vibration motor fixed to the frame and arranged below the button,
   wherein the frame has a mounting hole penetrating through the frame; the frame comprises an outer side surface and an inner side surface opposite to the outer side surface, and the mounting hole penetrates through both the outer side surface and the inner side surface; the vibration motor comprises a stator fixed to the inner side surface of the frame, an antenna arranged in the mounting hole, and an elastic connection member that connects the antenna to the stator; and a direction of a pressing force of the button is perpendicular to a vibrating direction of the antenna;
   the stator comprises a baseplate fixed to the frame and a solenoid assembly fixed to the baseplate, and the elastic connection member comprises an end connected to the antenna and another end connected to the baseplate;
   the antenna comprises a housing and a magnet fixed in the housing, the housing is fixed to the button, and the magnet is arranged at two sides of the solenoid assembly;
   the magnet comprises a pair of magnets, the pair of magnets is magnetized along the vibrating direction of the antenna, and the pair of magnets is arranged with same poles facing each other.

* * * * *